H. R. CURWEN.
STEERING AND BRAKING MECHANISM FOR SLEDS.
APPLICATION FILED FEB. 23, 1912.
1,055,883.
Patented Mar. 11, 1913.
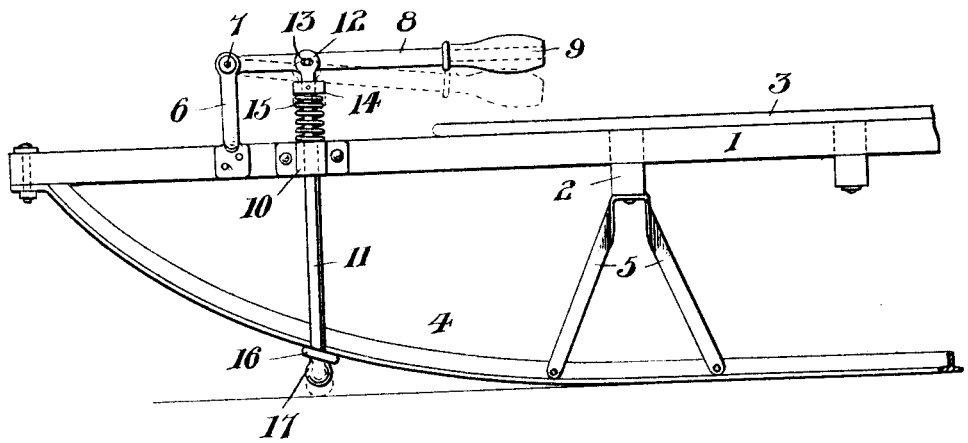
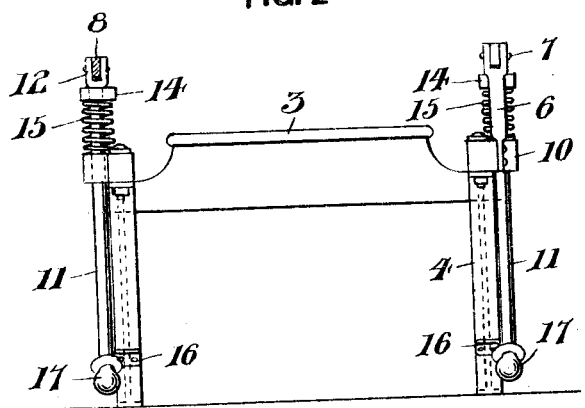
WITNESSES
INVENTOR
H. R. Curwen
BY
ATTORNEYS

UNITED STATES PATENT OFFICE.

HENRY R. CURWEN, OF INGRAM, PENNSYLVANIA.

STEERING AND BRAKING MECHANISM FOR SLEDS.

1,055,883.　　　　　Specification of Letters Patent.　　Patented Mar. 11, 1913.

Application filed February 23, 1912. Serial No. 679,413.

*To all whom it may concern:*

Be it known that I, HENRY R. CURWEN, a citizen of the United States of America, residing at Ingram, in the county of Allegheny and State of Pennsylvania, have invented certain new and useful Improvements in Steering and Braking Mechanism for Sleds, of which the following is a specification, reference being had therein to the accompanying drawing.

This invention relates to a combined steering and braking mechanism for sleds, and the primary object of my invention is the provision of a simple and durable mechanism that will avoid the many accidents that occur due to control being lost of the sled when coasting.

Another object of this invention is to provide an inexpensive mechanism of the above type that is applicable to various types of sleds, the mechanism being arranged whereby it can be safely manipulated by the occupant of the sled for steering or braking purposes.

With the above and other objects in view, the invention resides in the novel construction, combination and arrangement of parts to be hereinafter specifically described and then claimed.

Reference will now be had to the drawing, wherein:—

Figure 1 is a side elevation of a portion of a sled in accordance with this invention, and Fig. 2 is a front elevation of the same.

The reference numeral 1 denotes the longitudinal frames of a sled that are connected by bolsters 2 supporting a seat 3. The frames 1 are provided with runners 4 and said runners are connected to the bolsters 2 by inverted V-shaped straps 5. The elements 1 to 5 inclusive are of a conventional form, and my invention resides in equipping the forward end of a sled with a steering and braking mechanism that can be safely used by the occupant of the sled. The outer sides of the frames 1 are provided with upwardly-extending standards 6 and pivotally connected to said standards, as at 7 are handle bars 8 having handles 9. The outer sides of the frames 1, adjacent to the standards 6, are provided with journals 10 and slidably mounted in said journals are rods 11. The rods 11 have the upper ends thereof formed with slotted bifurcated heads 12 that receive the handle bars 8 which are secured therein by pins 13. The rods 11, adjacent to the heads 12, are provided with collars 14 and encircling said rods, between the journals 10 and the collars 14, are coiled compression springs 15 that support the rods 11 in a normally elevated position. Secured to the outer face of the curved portions of the runners 4 are plates 16 having outwardly projecting eyes. The lower ends of the rods 12 extend through said eyes and the lower ends of each of said rods is provided with a club foot 17.

When coasting, a pressure upon either one of the handles 9 will lower the corresponding rod 11 and steer the sled in a desired direction, and by simultaneously pressing both handles the club feet of the rods 11 serve as brake shoes and retard the movement of the sled or eventually stop the same. By resorting to the use of the mechanism, the practice of using the toe of the shoe for steering purposes is obviated, consequently a saving in shoe leather, and the mechanism has a further advantage of providing handle bars that can be held by the occupant of the sled, thereby preventing the occupant from being thrown when a "bumper" or irregularity in the coasting surface is encountered.

What I claim is:—

The combination with the longitudinal bars of a bob sled frame, a seat mounted upon said bars, a pair of runners connected to said bars and having the forward portion thereof upwardly curved, of a journal secured to each bar forwardly of the seat, a plate secured to the lower face of each runner at the curved portion and projecting outwardly therefrom and provided with an eye, said eye in alinement with said journal, an upwardly-extending standard secured to each of said rods forwardly of the journals and provided with a bifurcated upper end, vertically disposed rods slidably mounted in said straps and eyes and provided each with a collar near its upper ends, a club foot at its lower end, rearwardly extending handle bars pivotally connected in the bifurcated ends of said arms and pivotally connected intermediate their ends in the upper ends of said rods, and springs surrounding said rods and interposed between said collar and straps for normally retaining said feet in an inactive position.

In testimony whereof I affix my signature in the presence of two witnesses.

HENRY R. CURWEN.

Witnesses:
 MAX H. SROLOVITZ,
 CHRISTINA T. HOOD.